US012224520B2

(12) United States Patent
Lozhko

(10) Patent No.: US 12,224,520 B2
(45) Date of Patent: Feb. 11, 2025

(54) ELECTRICAL CONNECTOR

(71) Applicant: PPC BROADBAND, INC., East Syracuse, NY (US)

(72) Inventor: Andriy Lozhko, Syracuse, NY (US)

(73) Assignee: PPC BROADBAND, INC., East Syracuse, NY (US)

( * ) Notice: Subject to any disclaimer, the term of this patent is extended or adjusted under 35 U.S.C. 154(b) by 420 days.

(21) Appl. No.: 17/842,032

(22) Filed: Jun. 16, 2022

(65) Prior Publication Data

US 2022/0416472 A1 Dec. 29, 2022

Related U.S. Application Data

(60) Provisional application No. 63/216,156, filed on Jun. 29, 2021.

(51) Int. Cl.
*H01R 13/52* (2006.01)
*H01R 24/54* (2011.01)
*H01R 103/00* (2006.01)

(52) U.S. Cl.
CPC ......... *H01R 13/5213* (2013.01); *H01R 24/54* (2013.01); *H01R 2103/00* (2013.01)

(58) Field of Classification Search
CPC . H01R 13/5213; H01R 24/54; H01R 2103/00
USPC .......................................................... 439/578
See application file for complete search history.

(56) References Cited

U.S. PATENT DOCUMENTS 3,675,181 A 7/1972 Lankford et al.
4,691,430 A * 9/1987 Wheeler ............. E21B 17/0285 29/451
6,129,597 A * 10/2000 Gresko .................. H01R 24/52 439/583
2006/0160430 A1* 7/2006 Siddiqi ................ H01R 13/523 439/700
2008/0274636 A1* 11/2008 Marklove ............ H01R 13/521 439/271

(Continued)

FOREIGN PATENT DOCUMENTS

GB 2030378 A * 4/1980 ............. H01R 13/04
WO WO-2013048973 A2 * 4/2013 ........... E21B 17/028

OTHER PUBLICATIONS

International Search Report and Written Opinion dated Sep. 28, 2022 in corresponding International Application No. PCT/US2022/033783, 15 pages.

*Primary Examiner* — Gary F Paumen

(74) *Attorney, Agent, or Firm* — MH2 TECHNOLOGY LAW GROUP LLP

(57) ABSTRACT

A cable connector includes a housing, a conductive insert affixed within the housing, a first conductive plug, and a second conductive plug. The housing defines a first port, a second port, a third port, and a fourth port. The first conductive plug and the second conductive plug are removably affixed to the housing. The first conductive plug further includes a dust cap and an insulating pin that is rotationally fixed to the dust cap. The first conductive plug provides a single structure that is configured to block moisture and engage the first center conductor against the first end of the conductive insert. Alternatively, the first conductive plug may include a dust cap, an insulator and a pin that are rotationally affixed to one another.

21 Claims, 7 Drawing Sheets

(56) References Cited

U.S. PATENT DOCUMENTS

| | | | | |
|---|---|---|---|---|
| 2011/0034066 | A1* | 2/2011 | Jazowski | E21B 33/0385<br>439/426 |
| 2018/0034207 | A1* | 2/2018 | Czech | H01R 13/6315 |
| 2020/0287311 | A1 | 9/2020 | Ivancic et al. | |

* cited by examiner

ELECTRICAL CONNECTOR

CROSS-REFERENCE TO RELATED APPLICATION

This nonprovisional application claims the benefit of U.S. Provisional Application No. 63/216,156, filed Jun. 29, 2021. The disclosure of the prior application is hereby incorporated by reference herein in its entirety.

TECHNICAL FIELD

The present disclosure relates to the field of connectors that mechanically and electrically join or couple electrical conductors.

BACKGROUND

In communication systems in which signals are coupled via a coaxial cable, such as community antenna television (CATV) systems, various equipment housings are typically distributed along the cable. For example, the communication signals are attenuated by the coaxial cable and amplifiers are commonly placed at periodic intervals to maintain proper signal levels. Directional couplers, splitters, multi-taps, and similar passive devices are also interposed at various points in the system to provide signals to various secondary transmission paths. As a more specific example multi-taps are used in CATV systems to provide a plurality of subscriber drops for connection to television receivers in the subscribers' premises. Segments of the coaxial cable must be coupled to each of these various equipment housings.

Typical CATV installations can be either aerial or underground. In aerial installations the coaxial cable and equipment housings are typically suspended from a metal strand. In underground installations the cable is buried underground with the equipment housings ordinarily mounted in pedestals. When aerial strand mounting is used, it is normally desired to provide access ports to the equipment housings on opposite sides so that bending of the coaxial cable is minimized. When pedestal mounting is used in underground or buried installations, access ports on the same side of the equipment housing are normally desired. To accommodate these conflicting requirements, a pair of access points are normally provided at two corners of the equipment housing so that either type of mounting can be accommodated with a single equipment housing. The unused access ports are plugged or capped.

The two commonly used methods of connecting the coaxial cable to the equipment housing include a feed-through connector and a center-seized connector. In the feed-through connector, the center conductor of the coaxial cable feeds through the connector and is seized by a connector block within the equipment housing. In the center-seized connector, the center conductor of the coaxial cable is seized by the connector and mechanically connected to a pin or probe which inserts into the equipment housing and is connected therein, for example, by a connector block.

While connector blocks capable of receiving the center conductor of the coaxial cable or the substitute connector probe from two right-angle directions are known in the prior art, the technique normally used is to provide two intersecting threaded holes through the block at 90° along with two more threaded holes at the other end of the block wherein there is a third threaded hole through the other end of the block at 180° and fourth threaded hole which intersects the third threaded hole at 90°. The conductor to be seized is inserted through one of the holes and a clamping screw or set-screw is threaded into the other intersecting hole to clamp the conductor in the connector block. The set-screw presses the conductor against the wall of the intersecting hole. After the set-screw is threaded into the other intersecting hole, a dust cap is affixed to the splice block to cover the set screw.

In contrast to the traditional arrangement requiring a separate set screw (to press the conductor against the wall) and a separate dust cap to block moisture by covering the screw, it may be desirable to provide a single structure that is configured to perform both functions of blocking moisture and engaging contact between a center conductor and a conductive insert/portion of the connector block.

SUMMARY

In one embodiment of the present disclosure, a cable connector may include a housing, a conductive insert affixed within the housing, a first conductive plug and a second conductive plug. The housing may define a first port, a second port, a third port, and a fourth port. The first and second conductive plugs may be removably affixed to the housing. The first conductive plug provides a single structure that is configured to block moisture and engages contact between the first center conductor and the first end of the conductive insert by urging the first center conductor against first end of the conductive insert. Alternatively, the first conductive plug may include a dust cap, an insulator and a pin that are rotationally affixed to one another. The first port, the second port, the third port, and the fourth port may each be a threaded bore.

The first conductive plug is configured block moisture from entering the housing and is configured to push a first center conductor of a first cable against a first end of the conductive insert. The second conductive plug is configured block moisture from entering the housing and is configured to push a second center conductor of a second cable against a second end of the conductive insert.

The dust cap may define a recess configured to receive the insulating pin and wherein the insulating pin is press-fitted into the recess. The conductive insert may be formed by an elongated member which extends from a first housing end to a second housing end. The first end of the elongated member defines a first threaded bore and a second threaded bore. The second end of the elongated member defines a third threaded bore and a fourth threaded bore. The first threaded bore of the conductive insert may be co-axially aligned with the first port. The second threaded bore of the conductive insert may be co-axially aligned with the second port. The third threaded bore of the conductive insert may be co-axially aligned with the third port. The fourth threaded bore of the conductive insert may be co-axially aligned with the fourth port.

The insulating pin may include a first portion having a first diameter and a second portion having second diameter, and a third portion having a third diameter wherein the third diameter may optionally be less than each of the first diameter and the second diameter. The third portion of the insulating pin is configured to push a first central conductor of a first coaxial cable against the conductive insert.

In yet another embodiment of the present disclosure, a cable connector may include a housing, a conductive insert affixed within the housing, a first conductive plug, and a second conductive plug. The housing may define a first port, a second port, a third port, and a fourth port. The first and second conductive plugs may be removably affixed to the housing. The first conductive plug may further includes a dust cap, an insulator, and a pin which are rotationally affixed to each other. The first conductive plug provides a single structure that is configured to block moisture and engage contact between the first center conductor and the first end of the conductive insert by urging the first center conductor against first end of the conductive insert. The second conductive plug also provides a single structure that is configured to block moisture and engage contact between the second center conductor and the second end of the conductive insert by urging the second center conductor against the second end of the conductive insert.

The first conductive plug may be configured to block moisture from entering the housing and may also be configured to push a first center conductor of a first cable against a first end of the conductive insert. The second conductive plug may be configured block moisture from entering the housing and may also be configured to push a second center conductor of a second cable against a second end of the conductive insert. The first port, the second port, the third port, and the fourth port are each a threaded bore.

The dust cap may define a recess which is configured to receive the insulator wherein the insulator is press-fitted into the recess. The insulator of the second embodiment may further include a first portion and a second portion. The first portion may be press-fitted within the recess of the dust cap. The second portion may define an inner bore which is configured to receive a proximate end of a pin which is press-fitted into the inner bore. The pin may configured to push a first center conductor of a first cable against the conductive insert. The pin may optionally be formed from a conductive material.

The conductive insert of the second embodiment may further include an elongated member which extends from a first housing end to a second housing end. A first end of the elongated member may define a first threaded bore and a second threaded bore. A second end of the elongated member may defines a third threaded bore and a fourth threaded bore. The first threaded bore of the conductive insert may be co-axially aligned with the first port. The second threaded bore of the conductive insert may be co-axially aligned with the second port. The third threaded bore of the conductive insert may be co-axially aligned with the third port. The fourth threaded bore of the conductive insert may be co-axially aligned with the fourth port.

BRIEF DESCRIPTION OF THE DRAWINGS

Further advantages and features of the present disclosure will become apparent from the following description and the accompanying drawings, to which reference is made. In which are shown.

DETAILED DESCRIPTION

Figure 1:
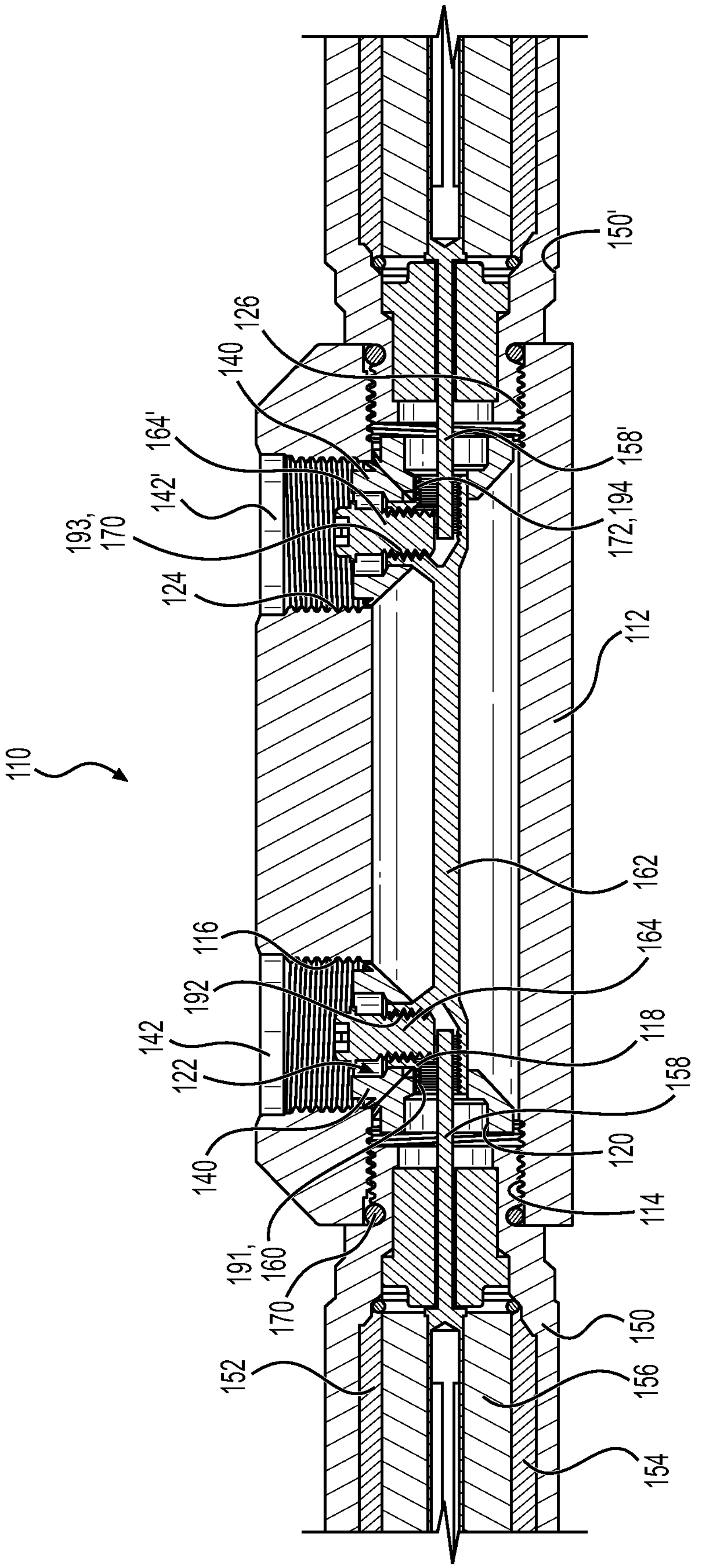
FIG. 1 (PRIOR ART)
FIG. 1 illustrates a longitudinal cross-section of a traditional connector.

Reference will now be made in detail to presently preferred compositions, embodiments and methods of the present disclosure, which constitute the best modes of practicing the present disclosure presently known to the inventors. The figures are not necessarily to scale. However, it is to be understood that the disclosed embodiments are merely exemplary of the present disclosure that may be embodied in various and alternative forms. Therefore, specific details disclosed herein are not to be interpreted as limiting, but merely as a representative basis for any aspect of the present disclosure and/or as a representative basis for teaching one skilled in the art to variously employ the present disclosure.

Except in the examples, or where otherwise expressly indicated, all numerical quantities in this description indicating amounts of material or conditions of reaction and/or use are to be understood as modified by the word "about" in describing the broadest scope of the present disclosure. Practice within the numerical limits stated is generally preferred. Also, unless expressly stated to the contrary: percent, "parts of," and ratio values are by weight; the description of a group or class of materials as suitable or preferred for a given purpose in connection with the present disclosure implies that mixtures of any two or more of the members of the group or class are equally suitable or preferred; the first definition of an acronym or other abbreviation applies to all subsequent uses herein of the same abbreviation and applies to normal grammatical variations of the initially defined abbreviation; and, unless expressly stated to the contrary, measurement of a property is determined by the same technique as previously or later referenced for the same property.

It is also to be understood that this present disclosure is not limited to the specific embodiments and methods described below, as specific components and/or conditions may, of course, vary. Furthermore, the terminology used herein is used only for the purpose of describing particular embodiments of the present disclosure and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, un-recited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. Where one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this present disclosure pertains.

Referring first to FIG. 1, it is known in the prior art to provide a splice block for connecting coaxial cables which are arranged orthogonally and/or colinearly. More particularly, the housing 112 is cast from a conductive metal, such as aluminum, and at a first end of the housing 112, a first pair of orthogonally arranged threaded identical openings 114, 116 which are in fluid communication with the inner chamber 118 via corresponding passages 120, 122. Similarly, at a second end of the housing 112, a second pair of orthogonally arranged threaded identical openings 124, 126 which are in fluid communication with each other.

A conductive insert 162 is provided within the housing 112 wherein the conductive insert 162 contains orthogonally arranged longitudinal and transverse threaded bores 191, 192, 193, 194 wherein first and second bores 190, 192 are defined at a first end of the insert 162 and the third and fourth bores 193, 194 are defined at a second end of the conductive insert 162.

Retainers 140 formed of a suitable non-conductive material may also be provided wherein the retainers 140 are arranged concentrically within each threaded opening 114, 116, 124, 126. In the example provided in FIG. 1, threaded openings 116, 124 and access to the corresponding screws 164, 164' are each closed by a water and pressure-proof aluminum plug 142, 142' wherein the plug 142, 142' is threaded onto the housing after each screw 164, 164' has been tightened into position within its corresponding insert bore—second insert bore 192 and third insert bore 193 as shown.

In FIG. 1, the traditional splice block 110 may be connected to a standard connector 150 which is threadably connected with the opening 114 wherein the free end of the coaxial cable 152 having an outer conductor 154, the intermediate spacer insulation layer 156, and a central inner conductor 158. The inner conductor 158 is clamped in the first insert bore 191 by the seizing screw 164, whereby current is conducted from center conductor 158 to insert 162 via screw 164. The housing 112 is electrically connected with the outer ground conductor 154 via connector 150. The housing 112 may be further sealed by the O-ring 170 that is compressed by connector 150 to seal the first threaded opening 114.

In the initial condition illustrated in FIG. 1, the first cable 152 and the second cable 152' are arranged colinearly arranged such that the cables 152, 152' are at opposite ends of the housing 112. Assume now that for reasons of space or location of the components, it is desired to arrange cables 152, 152' orthogonally to each other. Accordingly, plug 142' shown in FIG. 1 would be removed from threaded opening 124, and then screw 164' would be removed from third insert bore 193. Then, connector 150' and cable 152' would be removed from fourth threaded opening 126. The connector/cable 150, 152' would be reversed with the plug 142' and screw 164' so that the central conductor 158' of the second cable 152 would be introduced in the third insert bore 193 and third threaded opening. Connector 150' would be threadably connected in threaded opening 124 and screw 164' would be threaded into fourth insert bore 194 to seize the central conductor 158'. Once screw 164' is threaded into fourth insert bore 194 and seizes the central conductor 158', then the plug 142' would threadably connected in fourth threaded opening 126 to block off access to the threaded screw 164' and fourth threaded opening.

Figure 2:
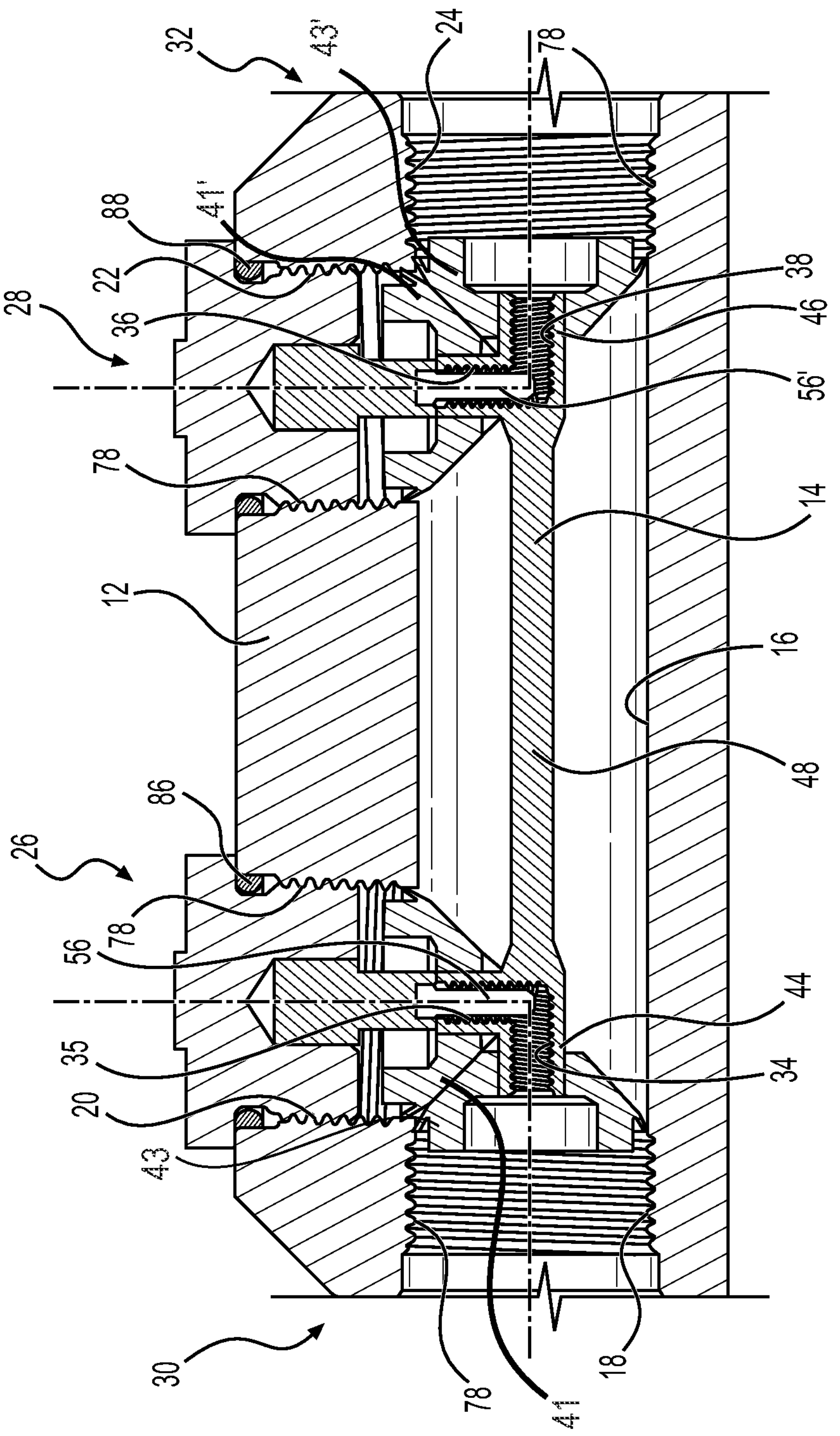
FIG. 2 illustrates a longitudinal cross-section of a first embodiment of the present disclosure.
Figure 3:
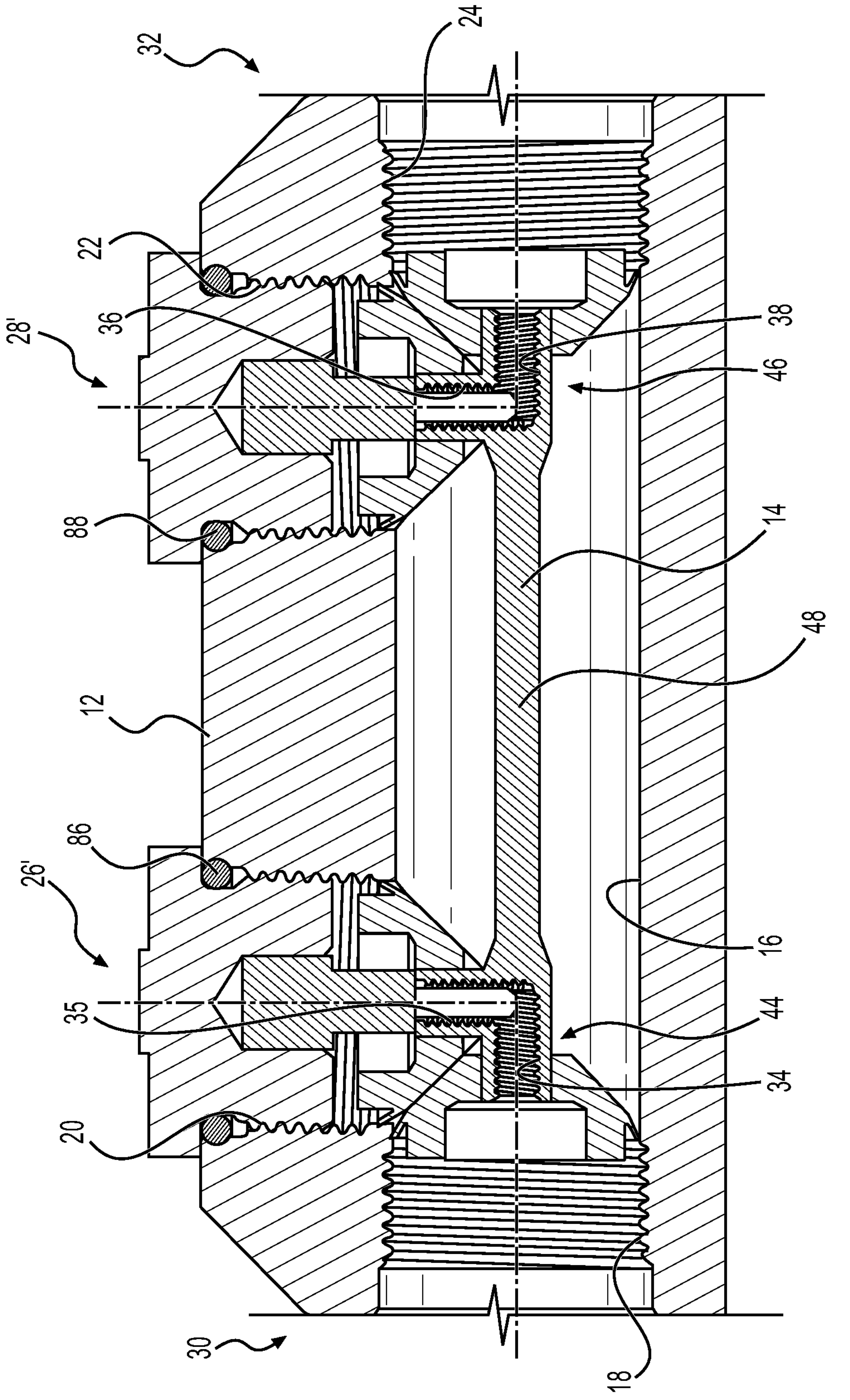
FIG. 3 illustrates a longitudinal cross-section of a second embodiment of the present disclosure.

With respect to the various embodiments of the present disclosure, the housing 12 contains conductive insert 14 which is rigidly supported in the longitudinal passage 16 by non-conductive retainers 41, 41', 43, 43'. (See FIG. 2). The housing 12 further defines a first port 18, a second port 20, a third port 22 and a fourth port 24. (See FIGS. 2-5). Each port 18, 20, 22, 24 may each be a threaded bore 78 defined in the housing 12 as shown in FIGS. 2 and 3. At least two ports may be configured to receive a first conductive plug 26 and a second conductive plug 28 as later described herein.

The housing 12 may be cast from a conductive metal, such as aluminum, and contains at a first end of the housing 12 a pair of orthogonally arranged threaded identical ports (first port 18 and second port 20) that are in fluid communication with each other via first insert bore 34 and second insert bore 35. Similarly, at a second end 32 of the housing 12, the third port 22 and fourth port 24 may also be orthogonally arranged threaded identical ports which also communicate with each other via third insert bore 36 and fourth insert bore 36. The first end 44 of the conductive insert 14 is in electric communication with the second end 46 of the conductive insert 14 due to the conductive nature of material used to form the conductive insert 14.

Figure 4:
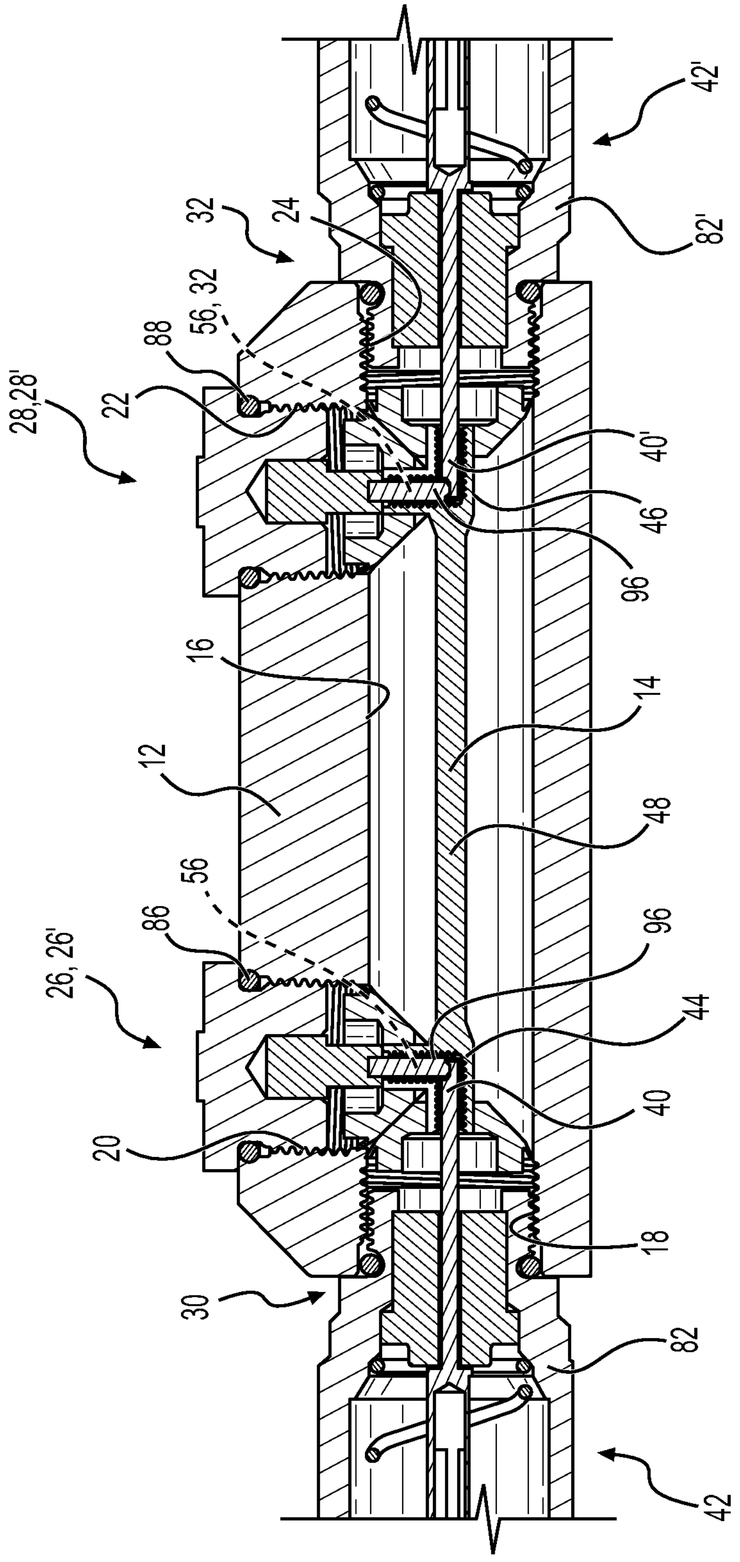
FIG. 4 illustrates a longitudinal cross-section of a cable connector of the present disclosure wherein a first cable and a second cable are colinearly connected via the housing.
Figure 5:
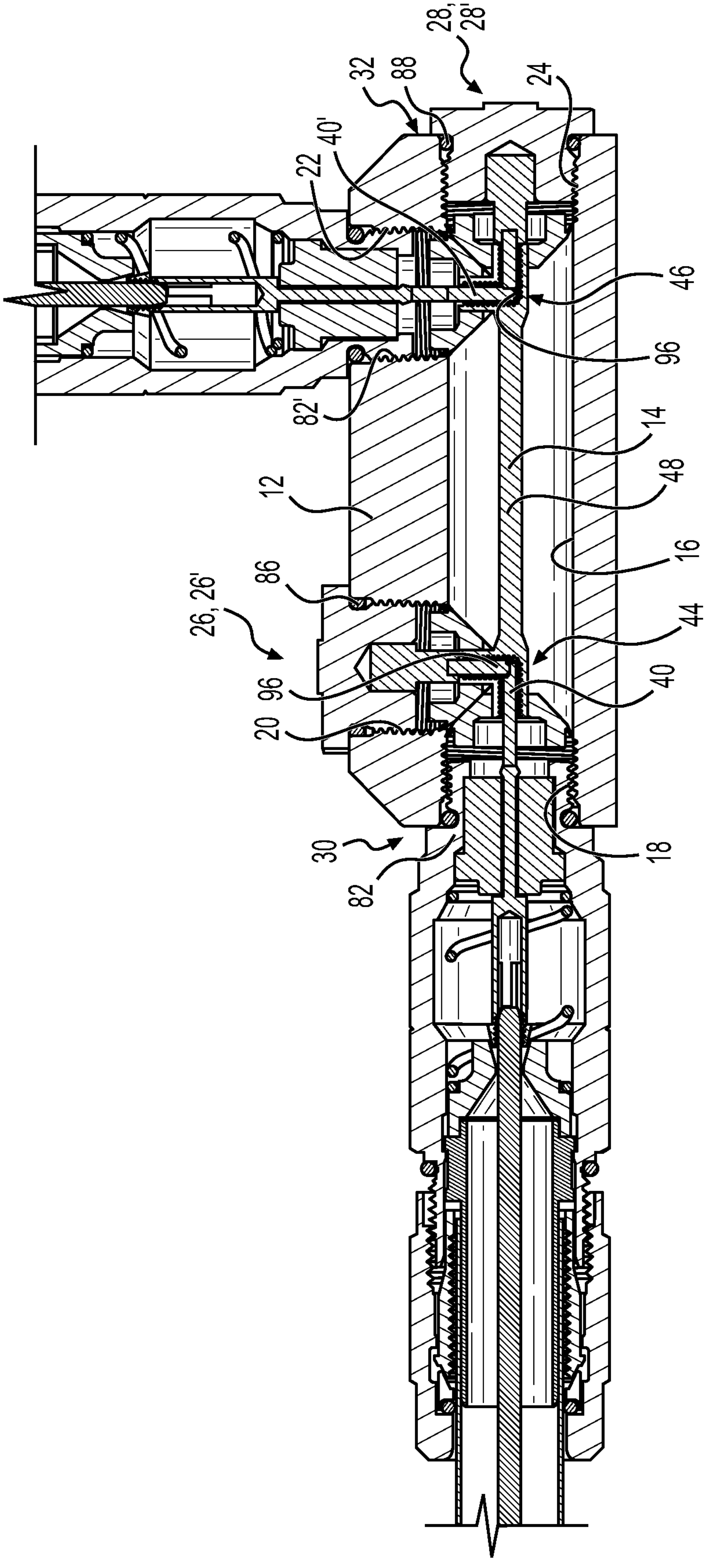
FIG. 5 illustrates a longitudinal cross-section of a cable connector of the present disclosure wherein a first cable and a second cable are orthogonally connected via the housing.
Figure 6:
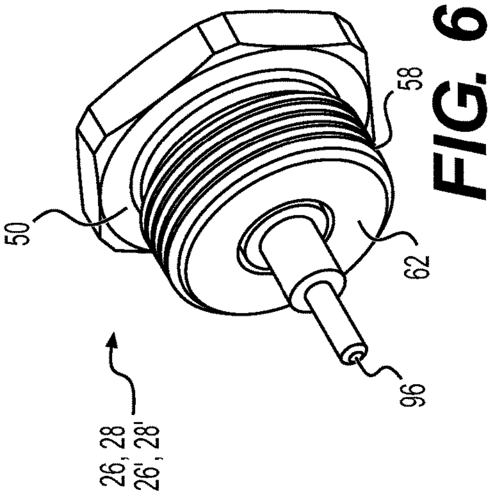
FIG. 6 illustrates an isometric view of a conductive plug which may be a first conductive plug or a second conductive plug.

The various embodiments of the splice block connector 10, 10' of the present disclosure also includes a first conductive plug 26 and a second conductive plug 28. As shown in FIGS. 4 and 5, the first conductive plug 26 is configured to: (1) block moisture from entering the housing 12; and (2) push a first center conductor 40 of a first cable 42 against a first end 44 of the conductive insert 14; and the second conductive plug 28 is configured to: (1) block moisture from entering the housing 12; and (2) is configured to push a second center conductor 40' of a second cable 42' against a second end 46 of the conductive insert 14. Also, in the various embodiments of the present disclosure, the conductive insert 14 may be an elongated member 48 which extends from a first housing end 30 to a second housing end 32. A first end 44 of the elongated member 48 defines a first insert bore 34 and a second insert bore 35. A second end 46 of the elongated member 48 defines a third insert bore 36 and a fourth insert bore 38. The first insert bore 34, second insert bore 35, third insert bore 36, and fourth insert bore 38 may each be a threaded bore 78. The first insert bore 34 may be orthogonal to the second insert bore 35, and the third insert bore 36 may be orthogonal to the fourth insert bore 36. (see FIGS. 2-5). Moreover, as shown in FIGS. 4-5, the first insert bore 34 of the conductive insert 14 may be co-axially aligned with the first port 18, the second insert bore 35 of the conductive insert 14 may be axially aligned with the second port 20, the third insert bore 36 of the conductive insert 14 may be axially aligned with the third port 22, and the fourth insert bore 36 of the conductive insert 14 may be axially aligned with the fourth port 24. Moreover, the various embodiments of the splice block connector 10, 10' of the present disclosure are configured to mechanically and electrically connect a first cable 42 and a second cable 42' wherein the first and second cables 42, 42' each include a center conductor 40, 40'.

As shown in the first example splice block connector 10 of the present disclosure (FIGS. 2 and 4), a center conductor 40 of a first cable 42 (FIG. 4) being may be seized by a pin 56 of the first conductive plug 26 so that the center conductor 40 of the first cable 42 abuts the first end 44 of the conductive insert 14. Referring now to the example shown in FIGS. 2, 7A, 8A, the first conductive plug 26 may include a dust cap 50, an insulator 54, and a pin 56. The dust cap 50, the insulator 54 and the pin 56 may all be rotationally fixed to one another. The dust cap 50 may have a threaded shaft 58 which defines a recess 60 at a dust cap end 62 of the threaded shaft 58. The recess 60 is configured to receive an insulator 54 which may be press fitted into the recess 60 of the dust cap 50.

Figure 7B:
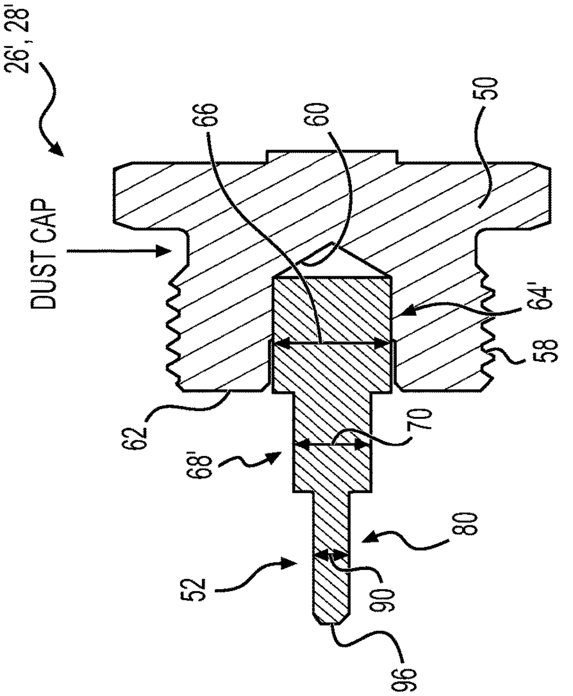
FIG. 7B illustrates a cross sectional view of a second example conductive plug which may be a first conductive plug and/or a second conductive plug.
Figure 7A:
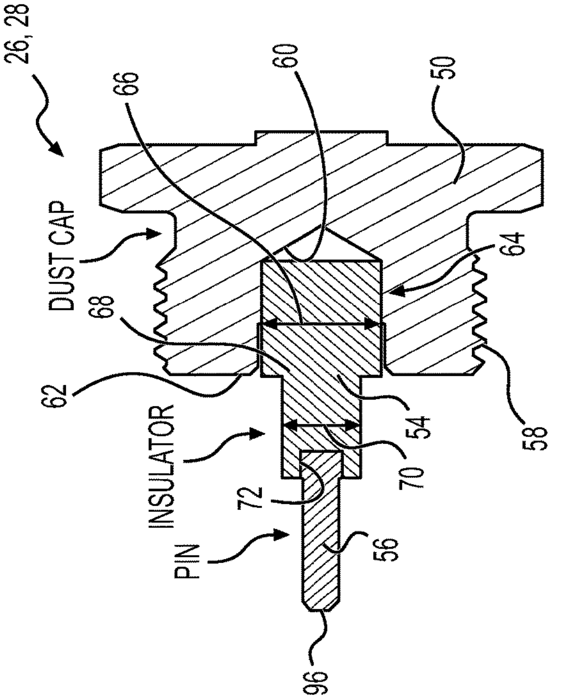
FIG. 7A illustrates a cross sectional view of a first example conductive plug which may be a first conductive plug and/or a second conductive plug.
Figure 8B:
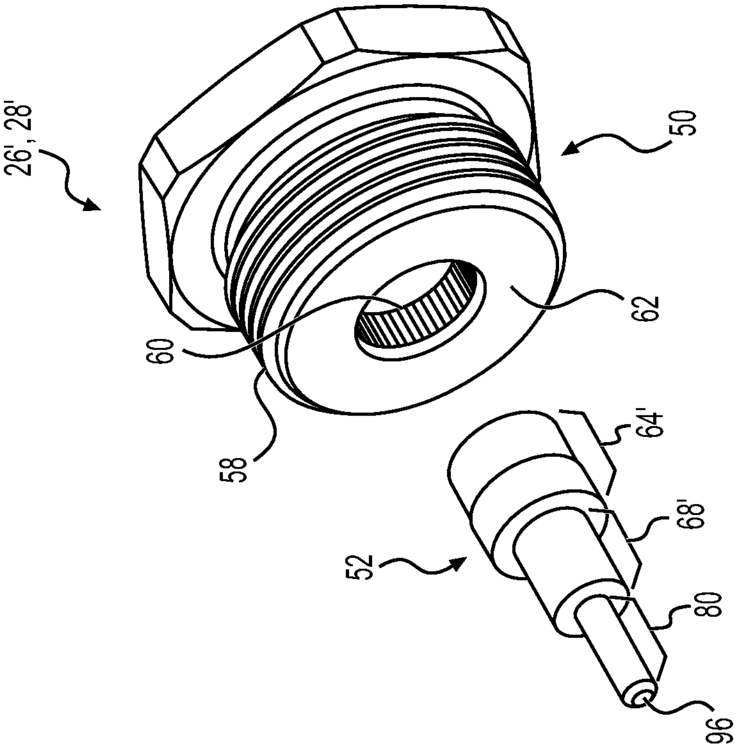
FIG. 8B illustrates an expanded, assembly view of the second example conductive plug which includes an insulating pin and a dust cap.
Figure 8A:
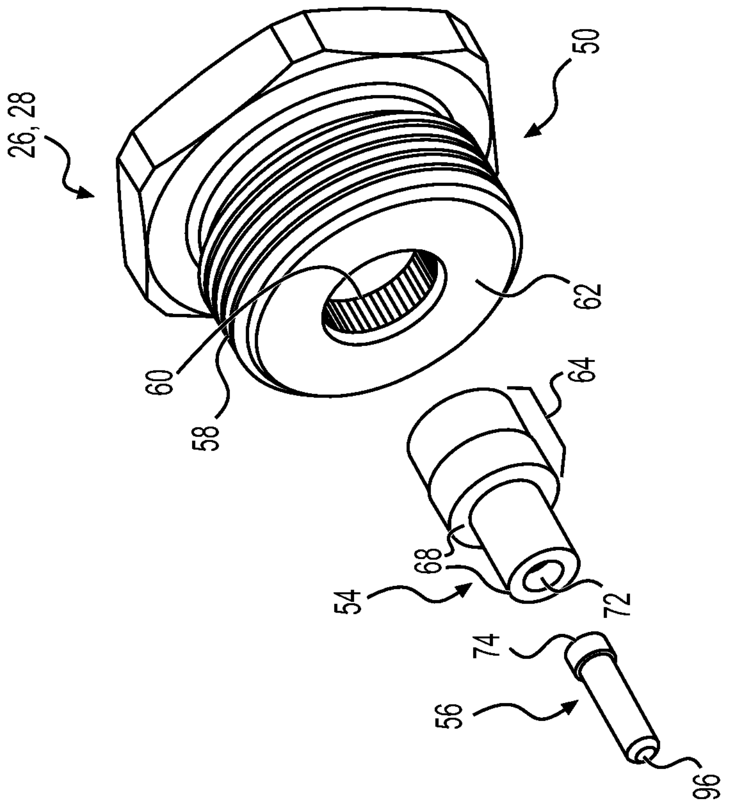
FIG. 8A illustrates an expanded, assembly view of the first example conductive plug which includes a pin, an insulator and dust cap.

As shown in the first example in FIGS. 2, 7A and 8A, the insulator 54 of the first conductive plug 26 includes a first portion 64 having a first diameter 66 and a second portion 68 (FIG. 8A) having second diameter 70 (FIG. 7A) which may not be equal to the first diameter 66. In the example shown in FIG. 7A, the second diameter 70 is less than the first diameter 66. The first portion 64 of the insulator 54 may be disposed within the recess 60 of the dust cap 50. The second portion 68 of the insulator 54 may be integral to the first portion 64 and may extend away from the dust cap 50. The second portion 68 of the insulator 54 further defines an inner bore 72 which is configured to receive a proximate end 74 of a pin 56. The pin 56 may be formed from a conductive material and may be press-fitted in the inner bore 72 of the insulator 54. As shown in FIG. 4, the pin 56 is configured to push a central conductor 40 of a coaxial cable 42 against conductive insert 14 when first conductive plug 26 is threaded into the second port 20.

In yet another example shown in FIGS. 3, 7B and 8B, the first conductive plug 26' may alternatively include a dust cap 50 and an insulating pin 52 which may be rotationally fixed to one another. In this alternate design, the dust cap 50 may similarly have a threaded shaft 58 which defines a recess 60 at a dust cap end 62 of the threaded shaft 58. As shown, the insulating pin 52 may include a first portion 64' having a first diameter 66' and a second portion 68' having second diameter 70', and a third portion 80 having a third diameter 90. (See FIG. 7B). The recess 60 is configured to receive an insulating pin 52 wherein at least part of a first portion 64' of the insulating pin 52 is press fitted into the recess 60 of the dust cap 50. The first, second, and third diameters 66', 70' and 90 may optionally be unique to one another as shown in FIG. 7B. In the example shown in FIG. 7B, the second diameter 70 is less than the first diameter 66, and the third diameter 90 is less than the second diameter 70. The first portion 64' of the insulating pin 52 may be disposed within the recess 60 of the dust cap 50. The second portion 68' of the insulating pin 52 may be integral to the first portion 64' and may extend away from the dust cap 50. The third portion 80 of the insulating pin 52 may be integral to the second portion 68' (and the first portion 64) wherein the third portion 80 extends away from the second and first portions 64', 68'. The third portion 80 is configured to push a central conductor 40 of a coaxial cable 42 against the conductive insert 14 when the dust cap 50 is threaded into the second port 20. (See FIG. 4).

A second conductive plug 28 may also be provided wherein the second conductive plug 28 (like the first conductive plug 26) may include a dust cap 50, an insulator 54, and a pin 56. (See FIG. 7A) The dust cap 50 of the second conductive plug 28 may have a threaded shaft 58 which defines a recess 60 at a dust cap end 62 of the threaded shaft 58. The recess 60 (FIGS. 7A, 8A) is configured to receive an insulator 54 which is press fitted into the recess 60 of the dust cap 50. As shown in FIG. 7A, the insulator 54 includes a first portion 64 having a first diameter 66 and a second portion 68 having second diameter 70 which may optionally not be equal to the first diameter 66. In the example shown in FIG. 7A, the second diameter 70 is less than the first diameter 66. The first portion 64 of the insulator 54 may be disposed within the recess 60 of the dust cap 50. (See FIG. 7A). The second portion 68 of the insulator 54 may be integral to the first portion 64 and may extend away from the dust cap 50. The second portion 68 of the insulator 54 further defines an inner bore 72 which is configured to receive a proximate end 74 of a pin 56. (See FIGS. 7A and 8A). The pin 56 may be formed from a conductive material and may be press-fitted in the inner bore 72 of the insulator 54. As shown in FIGS. 4 and 5, the pin 56 is configured to push a central conductor 40 of a coaxial cable 42 against the conductive insert 14 when (the dust cap 50 of) the second conductive plug 28 is threaded into the third port 22.

In another example, as shown in FIGS. 7B and 8B, the second conductive plug 28' may include a dust cap 50 and an insulating pin 52 which may be rotationally fixed to each other. In this alternate design, the dust cap 50 may have a threaded shaft 58 which defines a recess 60 at a dust cap end 62 of the threaded shaft 58. The recess 60 is configured to receive an insulating pin 52 which is press fitted into the recess 60 of the threaded shaft 58. The insulating pin 52 includes a first portion 64 having a first diameter 66 and a second portion 68 having second diameter 70, and a third portion 80 having a third diameter 90. (See FIG. 7B). The first, second, and third diameters 66, 70, 90 may be unique to one another. In the example shown in FIG. 7B, the second diameter 70 is less than the first diameter 66, and the third diameter 90 is less than the second diameter 70. The first portion 64 of the insulating pin 52 may be disposed within the recess 60 of the dust cap 50. The second portion 68 of the insulating pin 52 may be integral to the first portion 64 and may extend away from the dust cap 50. The third portion 80 of the insulating pin 52 may be integral to the second portion 68 (and the first portion 64) wherein the third portion 80 extends away from the second and first portions 68, 64. The third portion 80 is configured to push a central conductor 40 of a second coaxial cable 42' against conductive insert 14 when the dust cap 50 of the second conductive plug 28 is threaded into the third port 22 (see FIGS. 4-5) or the fourth port 24 (see FIGS. 4-5).

It is understood that the plugs 26, 26', 28, 28' and cables 42, 42' are interchangeable. Therefore, upon removal of the second conducting plug 28, 28' from third port 22 (shown in FIG. 4), then a second cable 42' and a second connector 84 can be removed from the fourth port 24 and can then be inserted in third port 22. (See FIG. 5). Under this circumstance, the second conducting plug 28, 28' would then be inserted into the fourth port 24 as shown in FIG. 5. Similarly, upon removal of the first conducting plug 26, 26' from second port 20 (shown in FIG. 4), then a first cable 42 and a first connector 84 can be removed from the first port 18 and can then be inserted in second port 20. (not shown). Under this circumstance, the first conducting plug 26, 26' would then be inserted into the first port 18. (not shown).

Therefore, with respect to one embodiment of the present disclosure, the first conductive plug 26 and/or second conductive plug 28 may include a pin 56 which is formed of conductive material which is supported by the insulator 54.

It is also understood that the first conductive plug 26 and/or second conductive plug 28 may alternately include an insulating pin 52 as previously described. Thus, the first and/or second conductive plugs 26, 28 may have the same or different constructions: (1) dust cap 50 with insulating pin 52; or (2) dust cap 50, insulator 54 and pin 56 arrangement.

With respect to all embodiments of the present disclosure, a first seal 86 and a second seal 88 may be also be provided between the corresponding conductive plug 26, 28 and the housing 12 as shown in FIGS. 2-5 to further seal the housing 12 chamber from the atmosphere. At each distal end 96, the first and/or second conductive plug 26, 26', 28, 28' may be electrically connected with the center conductors 40, 40' of a coaxial cable 42, 42' that is threadably connected onto the housing 12 wherein each distal end 96 pushes the corresponding center conductor 40, 40' against the conductive insert 14. The free end of the first cable connector 82 may be slidably inserted in either the first port 18 or second port 20 of the housing 12. However, in the example provided in FIGS. 4 and 5, the first connector 82 and first cable 42 are inserted into the first port 18 of the housing 12. It is apparent that each central conductor 40, 40' of each cable 42, 42' is connected with the conductive insert 14 via the distal end 96 of each conductive plug 26, 26', 28, 28'. A cable seal 98, 98' may be provided wherein the cable seal 98, 98' is compressed between the corresponding connector 82, 82' and the housing 12 to prevent in a positive manner the entry of moisture into the inner chamber of the housing 12, thereby protecting electrical and mechanical connection between the first center conductor 40 and the conductive insert 14.

In the illustrated condition of FIG. 4, the first cable 42 and the second cable 42' are colinearly arranged end to end wherein the first central conductor 40 of the first cable 42 and the second central conductor 40' of the second cable 42' are connected via the conductive insert 14, the first conductive plug 26 and the second conductive plug 28. While the cables 42, 42' have been illustrated as being arranged end-to-end, it is apparent that the versatile splice block connector 10, 10' alternately permits connection of orthogonally arranged cables 42, 42' (shown in FIG. 5) or cables 42, 42' (shown in FIG. 4) that are arranged in a parallel manner with their free ends adjacent each other.

The various modifications of the present invention offer several important advantages. First, the connector 10, 10' is adapted to accept standard cable of various sizes. The cable connections may be in-line, orthogonal, parallel, or a combination thereof suitable for strand, pedestal or underground mounting. Complete installation of the amplifiers, splitters, tap offs, etc. is accomplished without exposing the circuitry to the environment, and the circuitry may be removed or replaced without disturbing the cable installation. A further advantage of the invention is that an operator, merely by using a conventional wrench, can readily open, loosen or tighten connection between a center conductor 40 of a cable and the housing 12. An operator may also easily relocate the angular relationship between the first and second cables 42, 42' using a conventional wrench. By the use of the right-angle seizing arrangement between the (first and/or second) conductive plug 26, 28 and a center conductor 40, 40' of a cable 42, 42', the cables 42, 42' can be connected to the rear of the amplifier housing 12, thus permitting closer clearance to phone lines and visible access for using the test probe on the sides of the amplifier. Other modifications may be made in the described apparatus without deviating from the inventive concepts as set forth above.

While example, non-limiting embodiments have been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A cable connector comprising:

a housing configured to define a first port, a second port, a third port, and a fourth port;

a conductive insert configured to be affixed within the housing;

a first conductive plug configured to be removably affixed to the housing;

a second conductive plug configured to be removably affixed to the housing;

wherein the first conductive plug includes a dust cap and an insulating pin which is configured to be rotationally fixed to the dust cap;

wherein the first conductive plug is configured to block moisture from entering the housing and is configured to push a first center conductor of a first cable against a first end of the conductive insert;

wherein the second conductive plug is configured to block moisture from entering the housing and is configured to push a second center conductor of a second cable against a second end of the conductive insert;

wherein the dust cap is configured to define a recess configured to receive the insulating pin and wherein the insulating pin is configured to be press-fitted into the recess;

wherein each of the first port, the second port, the third port, and the fourth port comprise a threaded bore;

wherein the conductive insert includes an elongated member which extends from a first housing end to a second housing end;

wherein a first end of the elongated member is configured to define a first threaded bore and a second threaded bore, and a second end of the elongated member is configured to define a third threaded bore and a fourth threaded bore;

wherein the first conductive plug is configured to engage the first center conductor to the first end of the conductive insert, and the second conductive plug is configured to engage the second center conductor to the second end of the conductive insert; and wherein the first conductive plug and the second conductive plug are each configured to provide a single structure that blocks moisture and engages contact between the conductive insert against one of the first center conductor or the second center conductor.

2. The cable connector as defined in claim 1, wherein the first threaded bore of the conductive insert is configured to be axially aligned with the first port, the second threaded bore of the conductive insert is configured to be axially aligned with the second port, the third threaded bore of the conductive insert is configured to be axially aligned with the third port, and the fourth threaded bore of the conductive insert is axially aligned with the fourth port.

3. The cable connector as defined in claim 1, wherein the insulating pin includes a first portion having a first diameter, a second portion having second diameter, and a third portion having a third diameter, wherein the third diameter is less than each of the first diameter and the second diameter.

4. The cable connector as defined in claim 3, wherein the third portion of the insulating pin is configured to push a first central conductor of a first coaxial cable against the conductive insert.

5. A cable connector comprising:

a housing defining a first port, a second port, a third port, and a fourth port;

a conductive insert affixed within the housing;

a first conductive plug removably affixed to the housing;

a second conductive plug removably affixed to the housing;

wherein the first conductive plug further includes a dust cap and an insulating pin that is rotationally fixed to the dust cap; and wherein the first conductive plug is configured to provide a single structure that blocks moisture and engages contact between the first center conductor and the first end of the conductive insert.

6. The cable connector as defined in claim 5 wherein the first conductive plug is configured block moisture from entering the housing and is configured to push a first center conductor of a first cable against a first end of the conductive insert; and wherein the second conductive plug is configured block moisture from entering the housing and is configured to push a second center conductor of a second cable against a second end of the conductive insert.

7. The cable connector as defined in claim 5 wherein the dust cap defines a recess configured to receive the insulating pin and wherein the insulating pin is press-fitted into the recess.

8. The cable connector as defined in claim 5 wherein each of the first port, the second port, the third port, and the fourth port are a threaded bore.

9. The cable connector as defined in claim 5 wherein the conductive insert further comprises an elongated member that extends from a first housing end to a second housing end; and wherein a first end of the elongated member defines a first threaded bore and a second threaded bore and a second end of the elongated member defines a third threaded bore and a fourth threaded bore.

10. The cable connector as defined in claim 9 wherein the first threaded bore of the conductive insert is axially aligned with the first port, the second threaded bore of the conductive insert is axially aligned with the second port, the third threaded bore of the conductive insert is axially aligned with the third port, and the fourth threaded bore of the conductive insert is axially aligned with the fourth port.

11. The cable connector as defined in claim 5 wherein the insulating pin includes a first portion having a first diameter and a second portion having second diameter, and a third portion having a third diameter wherein the third diameter is less than each of the first diameter and the second diameter.

12. The cable connector as defined in claim 11 wherein the third portion of the insulating pin is configured to push a first central conductor of a first coaxial cable against the conductive insert.

13. A cable connector comprising:

a housing defining a first port, a second port, a third port, and a fourth port;

a conductive insert affixed within the housing;

a first conductive plug removably affixed to the housing;

a second conductive plug removably affixed to the housing; and wherein the first conductive plug further includes a dust cap, an insulator, and a pin that are rotationally affixed to each other such that the pin is configured to engage a first center conductor of a cable to a first end of the conductive insert; and wherein the first conductive plug is configured to provide a single structure that blocks moisture and engages contact between the first center conductor and the first end of the conductive insert.

14. The cable connector as defined in claim 13 wherein the first conductive plug is configured block moisture from entering the housing and is configured to push a first center conductor of a first cable against a first end of the conductive insert; and wherein the second conductive plug is configured block moisture from entering the housing and is configured to push a second center conductor of a second cable against a second end of the conductive insert.

15. The cable connector as defined in claim 14 wherein the dust cap defines a recess configured to receive the insulator wherein the insulator is press-fitted into the recess.

16. The cable connector as defined in claim 15 wherein the insulator includes a first portion press-fitted within the recess of the dust cap and a second portion that defines an inner bore that is configured to receive a proximate end of a pin that is press-fitted into the inner bore.

17. The cable connector as defined in claim 16 wherein the pin is configured to push a first center conductor of a first cable against the conductive insert.

18. The cable connector as defined in claim 17 wherein the pin is formed from a conductive material.

19. The cable connector as defined in claim 13 wherein each of the first port, the second port, the third port, and the fourth port is a threaded bore.

20. The cable connector as defined in claim 13 wherein the conductive insert further comprises an elongated member that extends from a first housing end to a second housing end; and wherein a first end of the elongated member defines a first threaded bore and a second threaded bore and a second end of the elongated member defines a third threaded bore and a fourth threaded bore.

21. The cable connector as defined in claim 20 wherein the first threaded bore of the conductive insert is axially aligned with the first port, the second threaded bore of the conductive insert is axially aligned with the second port, the third threaded bore of the conductive insert is axially aligned with the third port, and the fourth threaded bore of the conductive insert is axially aligned with the fourth port.

* * * * *